Sept. 23, 1969           E. LEVIN           3,468,674
METHOD OF PROCESSING FRESH MEAT AND FISH
Filed July 27, 1966           3 Sheets-Sheet 1
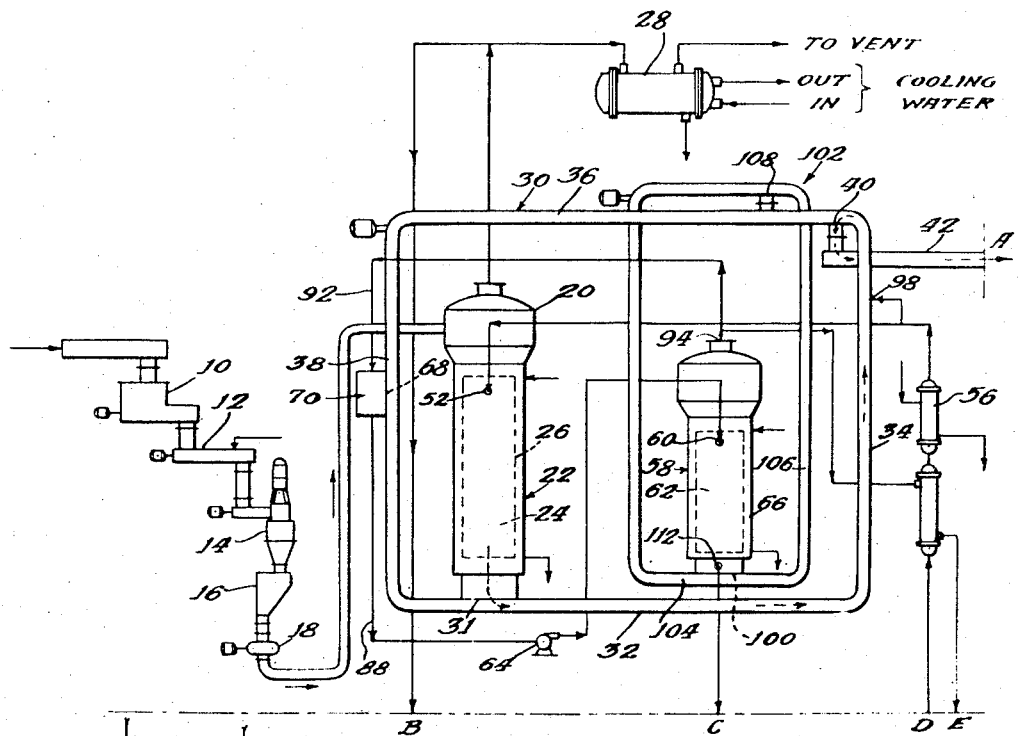
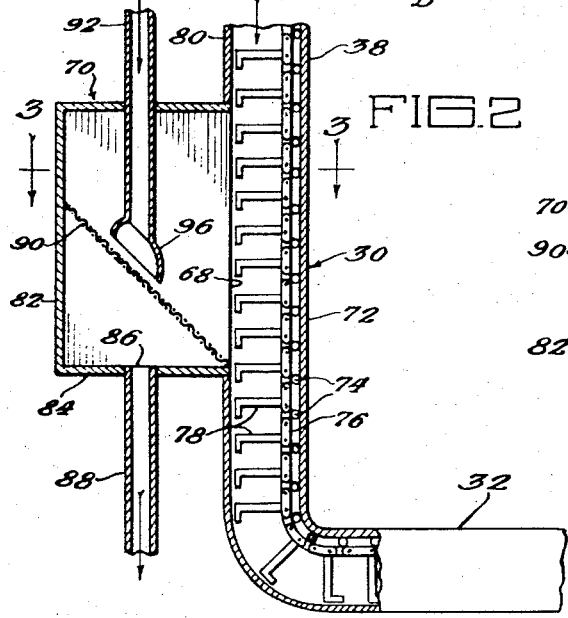
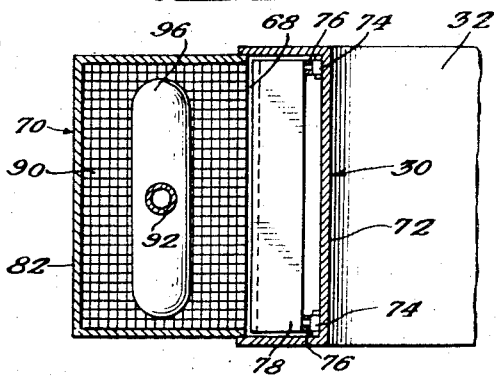
INVENTOR
Ezra Levin
BY Burmeister + Kulic
ATTORNEYS

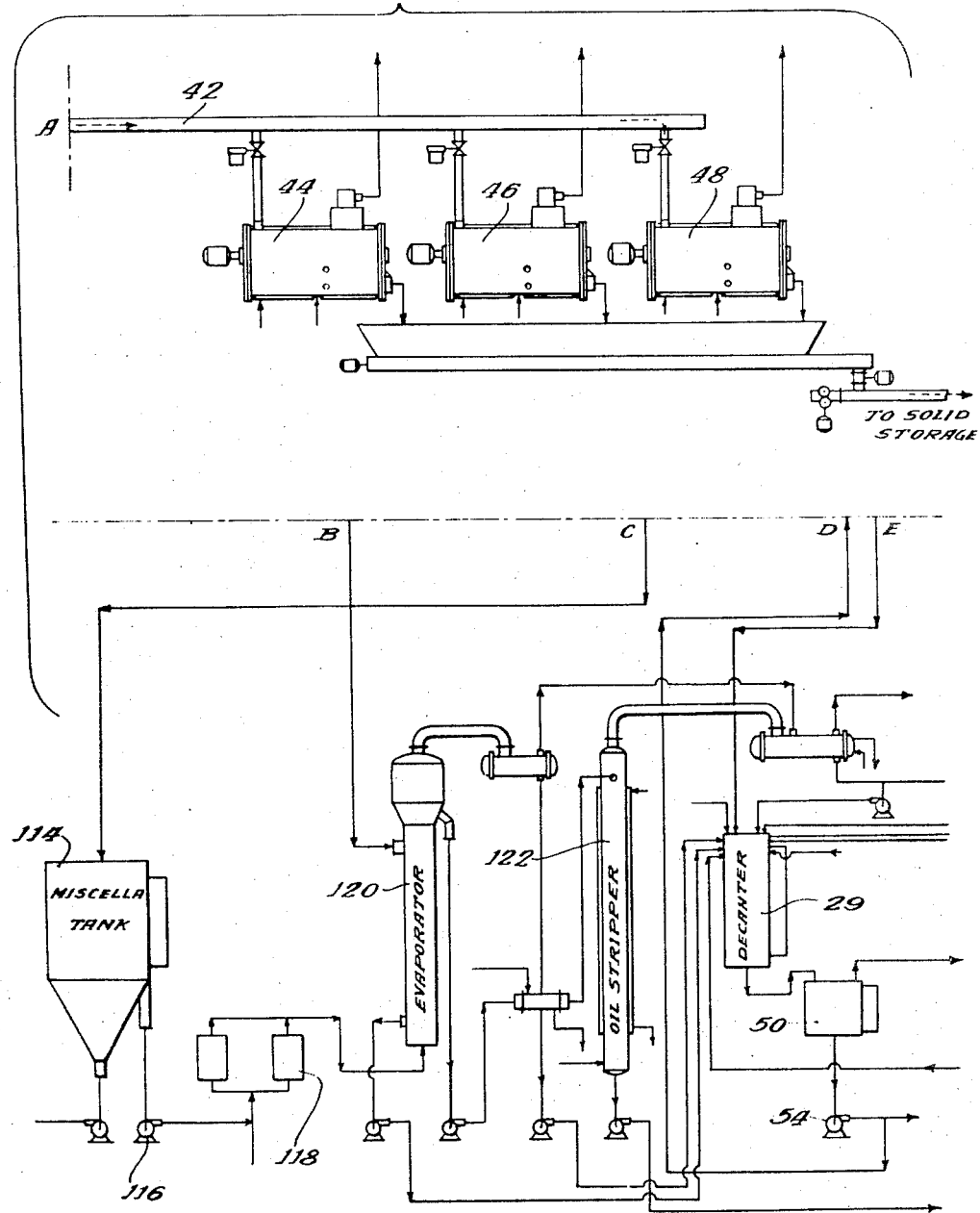

Sept. 23, 1969  E. LEVIN  3,468,674
METHOD OF PROCESSING FRESH MEAT AND FISH
Filed July 27, 1966  3 Sheets-Sheet 3
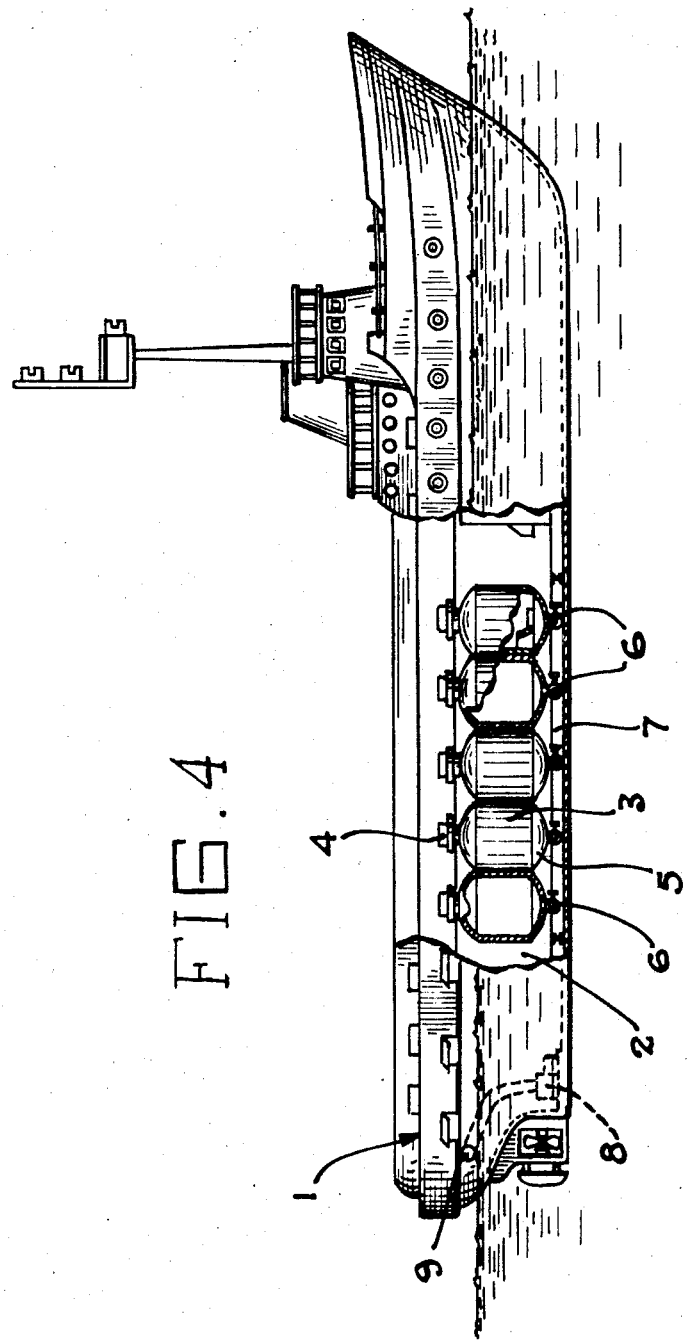
Inventor
Ezra Levin
By Burmeister & Kulie
Attorneys United States Patent Office 3,468,674
Patented Sept. 23, 1969

3,468,674
**METHOD OF PROCESSING FRESH
MEAT AND FISH**
Ezra Levin, 1109 W. University Ave.,
Champaign, Ill. 61820
Continuation-in-part of application Ser. No. 408,231,
Nov. 2, 1964. This application July 27, 1966, Ser.
No. 568,159
Int. Cl. A22c 25/00; A23j 1/04
U.S. Cl. 99—111
17 Claims

ABSTRACT OF THE DISCLOSURE

Biological substances which have been preserved by or contain a concentration of sulfurous acid of from .1 to 3.0 percent by weight are rendered suitable for consumption by converting the sulfurous acid into harmless sulfate and sulfite residues by heating and/or azeotropic distillation.

---

This application is a continuation-in-part of patent application Ser. No. 408,231, filed Nov. 2, 1964, entitled "Continuous Rendering Process and Apparatus." This invention relates generally to processes for preserving wet, fat biological substances for use as food or feed, particularly meat, fish and copra.

One of the most difficult foods to preserve is fresh fish. The sea water bacteria, in conjunction with enzymes and ferments develop an intensive decomposition activity immediately after killing of the fish. The autolytic processes generally proceed rapidly, producing harmful decomposition products and unpleasant and penetrating fish odor as a result of the formation of organic amines.

Fish are generally harvested far from the location of ultimate consumption, and methods must be used to conserve the fish or to preserve the fish between the time of harvest and use. Pickling, salting, sterilization, freezing, smoking, and antibiotics have been employed, but these are either expensive processes or impractical as far as preserving the whole fish is concerned.

The food value of fish may be preserved by deep-freezing the fish immediately upon killing, and various methods and apparatus have been developed for carrying out this process on the vessel on which the fish is harvested. Deep-freezing of fish, however, is a costly method of preservation. Deep-freezing fish at sea requires cumbersome and bulky equipment to be carried on shipboard, thereby reducing the capacity of the vessel for cargo. In addition, deep-freezing plants are costly to operate.

It is an object of the present invention to provide an improved method for preserving fish, whether whole or ground, which permits a prolonged period between the time of killing and ultimate processing, and particularly such a process which may be carried out sufficiently economically to permit its commercial use. In addition, it is an object of the present invention to provide a method for preserving fish which is fast acting and arrests changes in the fish immediately on application of the preservative.

The method of preserving fish until it can ultimately be processed should be suitable for use on shipboard. Preferably, the preservation process should be simple and require as little equipment as possible. It is highly desirable that fish be preserved in whole form, rather than ground prior to preservation, and that fish be preserved without washing or other preparation.

The inventor has found that whole or ground fish may be preserved at ambient temperatures when maintained in the presence of an atmosphere of sulfur dioxide gas for periods exceeding a month's time. Sulfur dioxide gas and sulfites have long been known for their preservative properties. Sulfites have been used to preserve sausages and canned meats, but such preservation methods have been discontinued because the concentration of residues left in the product are deemed sufficient to be harmful for human consumption. It is therefore a further object of the present invention to provide a method of processing wet, fat biological substances which have been preserved or processed in an atmosphere of sulfur dioxide or contain a concentration of sulfurous acid, and which results in a product containing only harmless residues in small concentration.

The present invention also has great utility for the economical processing of meats, particularly in the processing of offal. Offal deteriorates quickly and must be processed promptly to avoid rotting. Under present packing house practices, all of the offal is processed together since it cannot be stored. It would, however, be desirable and economically significant to store part of the offal so that blood, viscera, and bone may be processed separately. The present invention permits such a processing schedule.

Further, some meat packers produce relatively small quantities of offal. At the present time, small quantities of offal cannot be processed economically by azeotropic distillation as described in the inevntor's patent application indicated above, and must be transported to a plant central to a number of offal producers for processing. It is an object of the present invention to provide a method of economically preserving offal to permit its transportation to a processing plant and the necessary storage without creating a nuisance or damage to the protein and growth factors of the product.

It is a further object of the present invention to provide a method of processing biological tissue, such as meat and fish, which has been preserved by a sulfurous preservative to produce a product suitable for human consumption.

A stable animal or fish food product must have a low fat content and a low moisture content. It is a further object of the present invention to provide a method for processing animal products, such as eggs or meat and fish products which have been preserved by a sulfurous preservative to produce a dehydrated and defatted food product suitable for human consumption as well as animal feed.

The inventor has found that animal or fish substances may be preserved by a concentration of sulfurous acid within the substance from 0.1 to 3.0 percent cut by weight whether maintained in particle form or in chunk form, such as a whole fish, and such substances may be preserved for a period of days, weeks or months depending upon the concentration of sulfurous acid and the ambient temperature. Such concentrations of sulfurous acid render the substance inedible and unpalatable as feed, but the substance may be made edible by heating the substance for a sufficient period to volatilize a portion of the sulfurous acid and to convert a portion of the sulfurous acid to a sulfate. A harmless residue in the form of sulfite and sulfate is left in the product in small concentration, and the product is edible.

The inventor has found that it is preferable to simultaneously treat the sulfurous acid and defat and dehydrate the substance in accordance with the process described in the inventor's patent, No. 2,619,425, or patent application Ser. No. 408,231. The inventor has further found that it is preferable to provide and maintain the sulfurous acid content within the substance by maintaining the substance in an atmosphere of sulfur dioxide. In accordance with one use of the present invention, whole fish, which have been stored at ambient temperature for periods up to the order of two months in a sulfur dioxide atmosphere, are ground into small particles, and the particles are introduced into a vessel containing a body of boiling water-immiscible fat solvent which forms an azeotrope with water. During storage, the sulfur dioxide combines with the water in the fish to form sulfurous acid in the fish of a concentration between 0.1 percent and 3.0 percent by weight. Heating the particles results in volatilization of a portion of the sulfurous acid and conversion of a second portion of the sulfurous acid to sulfates, as well as boiling of the azeotrope, and the particles are dried by distillation of the azeotrope of water and solvent. As long as moisture remains in the vessel, the vessel boils at the temperature of the azeotrope. The partially or completely dehydrated particles fall through the slurry to the bottom of the vessel and the particles are removed from the bottom of the vessel. If the azeotropic distillation process is permitted to continue until completion, the boiling point of the slurry will rise to the tempterature of the boiling point of the solvent, and all particles will be reduced to a low moisture and fat content. The fat is removed from the vessel in the form of a miscella. A residue from the sulfurous acid preservative remains in the particles after dehydration. When the sulfurous acid undergoes a chemical change, it leaves a sulfate residue in the particles which largely combines with either calcium or sodium present in the fish to form $CASO_4$ or $NA_2SO_4$. Both of these sulfates are harmless materials and are a part of the residue. This residue also contains bisulfite.

After dehydration and defatting, the particles are desolventized by subjecting the particles to an atmosphere of steam, thereby vaporizing the solvent, and thereafter evacuating the solvent vapors. This process also has the effect of volatilizing and converting a portion of the bisulfite which remains in the product. The inventor has found that desolventizing and completion of the volatilizing and conversion of bisulfite to sulfates is completed in one-half hour to four hours by use of a steam atmosphere.

After desolventizing, the product may be deodorized, particularly if a fish product. This is accomplished in accordance with the teachings of the present inventor set forth in Patent No. 2,972,542 entitled "Preparing Deodorized Fish Products." The defatted and dehydrated particles, following desolventizing, are treated with alcohol, or an oxidizing agent to remove undesirable odors of fishy smells, in accordance with the teachings of the inventor's patent, No. 2,972,542. However, in addition to removing odoriferous materials from the product, a portion of the residue is also removed. The bisulfite residue may be reduced to approximately 2000 parts per million by this process.

The inventor has long known that the process of defatting and dehydrating a wet, fat biological substance by azeotropic distillation with a water immiscible polar solvent, as described in his patent, No. 2,619,425 or patent application Ser. No. 408,231, tends to oxidize and tie up certain amino acids, particularly methionine and cysteine, which are present in the substance. It is also an object of the present invention to provide such a defatting and dehydrating process which protects the amino acids in the substance from oxidation.

The inventor has found that treating biological substances with sulfur dioxide, prior to dehydrating and defatting by azeotropic distillation, as taught by Patent No. 2,619,425 and application Ser. No. 408,231, will protect against oxidizing and tieing up methionine and cysteine so that they are available in the end product.

The inventor has found that the present invention may be practised also by treating the sulfurous acid separately from defatting and dehydrating the substance, and the present invention may also be practised by treating the sulfurous acid simultaneously with completing some other step of a process which ultimately defats and dehydrates wet tissue.

The present invention will be more fully understood from a consideration of the following specification in the light of the accompanying drawings, in which:

FIGURES 1 and 1A are a flow diagram for a plant for use in the present invention;

FIGURE 2 is a sectional view of a portion of the main conveyor diagrammatically illustrated in FIGURE 1;

FIGURE 3 is a sectional view taken along the line 3—3 of FIGURE 2; and

FIGURE 4 is an elevational view of a ship for harvesting fish equipped in accordance with the present invention.

It is to be understood that the process of preserving tissue suitable for food is equally applicable to all animal and fish products, but the invention is illustrated for convenience as applied to fish. Fish present a particularly difficult problem, since conventional methods of harvesting fish require processing of the fish at least partially before the fishing vessel reaches port if the nutritional value of the fish is to be fully retained. It is also of great advantage to employ the present process with meat, particularly meat scrap. Continuous azeotropic distillation plants, such as set forth in the inventor's patent application Ser. No. 408,231, are most economically constructed for large capacities, and it is desirable to transport the meat scrap from a number of butchering establishments to a single centrally located continuous defatting and dehydrating plant. This can be done economically and without loss of nutritional value in accordance with the present invention.

FIGURE 4 illustrates a typical conventional fishing trawler 1 which has been equipped for carrying out the processes of the present invention. The trawler 1 has a hold 2 which contains a plurality of vessels 3 which are adapted to house and contain freshly caught fish. Each of the vessels is provided with an air tight cover 4 which protrudes through the deck of the ship and is accessible from the deck. In addition, each of the vessels 3 has a concave bottom 5 with an aperture at the lowest point thereof connected through a manually actuable valve 6 to a pipeline 7. The pipeline 7 is connected to a pump 8 located below the vessels 3 and the pipeline 7, and the pump 8 communicates with a port 9 located above the water line.

In accordance with the present invention, fish are harvested from the sea and thrown directly into one of the vessels 3. The fish are not preprocessed in any manner whatever, and the fish need not be dead when placed in the vessel. The fish when placed in the vessel 3, like all fish found in nature, are not sterile, and contain large quantities of sea water bacteria, particularly adjacent to the skin of the fish.

As each vessel 3 is filled, the vessel is sealed and filled with sulfur dioxide gas. A particularly suitable way in which to accomplish this operation is to add bisulfite above the mass of fish within the vessel 3. Any bisulfite which releases sulfur dioxide when contacted with water is suitable, such as sodium bisulfite, metabisulfite, pyrosulfite and other bisulfites. Sodium bisulfite is a preferred sulfite, and may merely be poured in granular form on the mass of fish within the vessel. Sodium bisulfite forms an aqueous solution with the water in and on the harvested fish with the release of sulfur dioxide, as follows:

$$2NaHSO_3 \rightarrow SO_2 + Na_2SO_3 + H_2O$$

After supplying the granular sulfite, the cover 4 is sealed on the vessel and the valve 7 at the bottom of the vessel is opened. Sulfur dioxide gas also may be directly used from tanks containing the gas under pressure, and it is to be understood that this process is fully equivalent to that of applying granular sulfite.

The pump 8 is utilized to remove any water or other liquid which may be present in the vessel 3. When sulfur dioxide gas begins to be present at the port 9, liquid having ceased to be ejected therefrom, the valve 6 located at the bottom of the vessel 3 is closed, and the sulfur dioxide atmosphere within the vessel 3 is secured. The sulfur dioxide penetrates the fish and combines with the water in and about the fish to form sulfurous acid, as follows:

$$SO_2 + H_2O \rightleftharpoons H_2SO_3$$

The reaction is reversible, hence requiring an adequate sulfur dioxide atmosphere to maintain the preserving sulfurous acid.

The inventor has found that sulfur dioxide gas in adequate quantity may be formed by sodium bisulfite in the manner described above when applied in a quantity no greater than 4 percent by weight of the quantity of fish within the vessel 3. Under normal conditions, sodium bisulfite in an amount equal to 2 percent of the weight of the fish has been found adequate, and in cold weather, the quantity of sodium bisulfite may be reduced to 1 percent by weight of the fish. In warm weather, or hot weather, an additional quantity of sodium bisulfite is usually necessary, generally 3 percent by weight of the fish present.

It is to be understood that fish or meat may be preserved in the presence of sulfur dioxide gas whether in whole form, or in ground form. Further, fish or meat may be preserved as described with other forms of bisulfite.

When the fish is removed from the vessel 3, it is not fit for consumption by man or animal and it must be processed to remove the sulfurous acid and sulfur dioxide. The inventor has found that a particularly suitable manner of processing the fish or meat containing sulfurous acid and sulfur dioxide is to grind the tissue into comminuted particles and subject the particles to azeotropic distillation in an apparatus such as set forth in FIGURES 1 through 3.

As indicated in FIGURE 1, biological tissue, such as meat or fish, whether whole or chopped, is transformed into a pumpable fluid by means of a prebreaker 10, feed screw 12, disintegrator 14, and hopper 16. The small particles of meat or fish are subjected to low pressure steam which is introduced prior to the hopper 16, specifically into the feed screw 12.

A feed pump 18 is then utilized to pump the pumpable particles into the upper portion or head 20 of a primary cooker 22 or first distillation vessel. The primary cooker 22 is a vertically disposed elongated vessel with the head 20 positioned at the top thereof. A body of substantially water immiscible fat solvent is disposed within the primary cooker below the head thereof. The body of solvent, designated 24, must have a boiling point under the conditions of operation of at least 65° centigrade and must form an azeotrope with water preferably boiling below 100° centigrade under operating pressure. The solvent should be selected to form an azeotrope which will remove substantial portions of water in relation to the amount of solvent distilled at the operating temperature selected. Among solvents of this class, ethylene dichloride is a preferred solvent. Ethylene dichloride has a boiling point at atmospheric pressure of 83° C., and a water-ethylene dichloride azeotrope boils at 71.5° C.

Another example of a particularly suitable solvent is heptane which boils at 98.4° C. at atmospheric pressure. A water-heptane azeotrope boils at 79.5° C. under atmospheric conditions. Other suitable solvents include propylene dichloride, trichlorethylene, perchlorethylene, and other low boiling chlorinated solvents. Suitable chlorinated solvents may include the bromine, iodine or fluorine derivatives of aliphatic hydrocarbons. In general, a suitable solvent must boil below 120° C. under standard conditions. The hydrocarbon fat solvents including benzene, hexane, toluene, cyclohexane, heptane, and others are suitable. The solvent must not be reactive with the tissue constituents or the preservative under operating conditions and must be capable of being removed by evaporation from the fat without leaving harmful or toxic residues.

The moist particles of fish or meat are continuously introduced into the boiling solvent within the primary cooker 22 by spraying the particles into the solvent adjacent to the upper level thereof, or some other suitable means which will avoid formation of an agglomeration of the particles. Fish and meat may be more easily ground and improved for pumping if treated with low pressure steam to convert part of the collagen to gelatin, as more fully described in the inventor's patent, No. 2,996,386 and as indicated in FIGURE 1. The particles are dehydrated and defatted in the primary cooker 22, at least to the extent that they cannot coalesce into lumps or stick to the vessel, but the particles all remain wet due to the fact that raw tissue particles are continuously introduced, thus maintaining a water-solvent azeotrope within the vessel. The particles of biological substances within the first vessel 22 do become heavier than the solvent due to partial drying, however, and tend to settle toward the bottom of the primary cooker 22, in spite of the violent boiling of the solvent.

As indicated in FIGURE 1, the primary cooker 22 is provided with an internal heater 26 which utilizes low pressure steam as a heat source in order to maintain the body 24 of solvent under rapid boiling conditions. Vapor from the body 24 of solvent rises through the head 20 of the primary cooker and is conducted to a condenser 28 which is provided with a flow of cool water. Both the solvent and the water vapor are condensed to liquid form, and the solvent and water vapor are separated by a decanter 29, as is well-known in the art. The hydrogen gas and water vapor are discarded, and the recovered solvent is returned to the system.

The bottom of the primary cooker 22 is in communication with a runaround main conveyor 30. Granules formed from the fish or meat settle through the boiling body 24 of solvent, pass through an opening 31 at the bottom of the primary cooker 22 and enter the bottom leg 32 of the conveyor 30. The conveyor 30 has four legs 32, 34, 36, and 38 forming a continuous rectangular path in a vertical plane, and a belt type conveyor is continuously translated within the four legs to elevate the granules passing through the opening 31 at the bottom of the primary cooker 22. The top leg 36 has an opening 40 which communicates with a horizontal conveyor 42 for transporting particles to one of a plurality of desolventizers 44, 46, or 48. The desolventizers are used in sequence and operate on the batch system.

A relatively large quantity of solvent is maintained in storage in a work tank 50, and this solvent is continuously introduced into a port 52 located near the upper level of the boiling body 24 of solvent in the primary cooker 22. A pump 54, and solvent heater 56 are connected in the path between the solvent work tank 50 and the port 52 to provide an adequate supply of heated solvent to the primary cooker 22 to maintain the level of the body 24 of solvent within the primary cooker.

Operation of the primary cooker results in the body 24 becoming a slurry of solvent, granules of wet-fat partially dried tissue, and fat which has been extracted from the tissue. Since raw tissue is continuously being introduced into the primary cooker 22, and the body 24 is violently boiling, the tissue is not permitted to dry. The relatively wet tissue is present throughout the body 24 of slurry because the azeotropic temperature is maintained while wet tissue is being added continuously. Under these conditions, the miscella is wet, and filtering the miscella would clog the filter. Thus, it is not possible to filter the miscella directly from the primary cooker 22.

A portion of the slurry which is formed in the primary cooker 22 is continuously introduced into a secondary cooker 58 through a port 60 located in the secondary cooker 58 near the top of a vigorously boiling body 62 of slurry from the primary cooker 22 disposed in a secondary cooker 58. A pump 64 located between the primary cooker 22 and the secondary cooker 58 maintains the body 62 at a relatively fixed level above the port 60. A heater 66 located within the secondary cooker 58 maintains the body 62 under boiling conditions.

The pump 64 is coupled into an opening 68 in the upper portion of the leg 38 of the conveyor 30. The conveyor travels in a counterclockwise direction, as indicated in FIGURE 1, and is hence travelling downwardly in the leg 38. The figures illustrate a filter 70 which is utilized to retain as many of the solid particles as possible in the primary cooker 22 and pass only a minimum number of solid particles in the miscella pumped by the pump 64 to the secondary cooker 58.

FIGURE 2 is a sectional view of the filter 70 showing a portion of the leg 38 of the conveyor 30. The conveyor 30 is formed by a continuous tube having a generally rectangular cross section. The inner wall 72 of the tube carries a plurality of rollers 74 which translatably support a plurality of links 76 of a continuous chain. Each of the links 76 carries an L-shaped shoe 78 which catches solid particles passing through the opening 31 from the primary cooker and carries the solid particles through the leg 32 and the leg 34 of the conveyor 30 to deposit them in the outlet 40 in the leg 36 thereof.

As illustrated in FIGURE 2, the conveyor 30 also has an outer wall 80, and the opening 68 which permits the slurry from the primary cooker 22 to flow to the pump 64 is disposed in this outer wall 80 of the leg 38 well below the level of the slurry in the primary cooker 22. A rectangular fluid-tight box 82 is sealed about the perimeter of the opening 68, and the box has a bottom 84 with an aperture 86 sealed to a tube 88 which communicates with the inlet of the pump 64.

A screen 90 is sealed within the box 82 on a plane at an angle to the horizontal in order to filter large particles from the flow of miscella to the pump 64, and hence to the secondary cooker. The screen 90 also has the function of limiting the flow of solid particles to the secondary cooker 58, and hence providing for removal of a large portion of the solid particles impressed upon the system through the conveyor 30 directly from the primary cooker 22. In practice, approximately 90 percent of the particles introduced into the primary cooker are removed by means of the primary conveyor 30, and the screen 90 contributes substantially to this result. If the screen were not present, experience proved that 30 to 40 percent of the particles would be reworked by pumping the particle laden miscella to the secondary cooker 58 for drying.

The wet miscella causes a glaze to develop and build on the screen 90, and unless some means is provided, the glaze will clog the screen, even if the perforations of the screen are very large. Even a wire mesh of sufficient size to permit the passage of 30 percent of the particles from the primary cooker to the secondary cooker will clog unless some means is provided to maintain the screen 90 sufficiently clean to pass the miscella.

A 20 mesh per inch screen will permit flow to the miscella by utilizing dry solvent vapors, such as are evaporated from the secondary cooker 58, to keep the screen 90 clean. A tube 92 communicates with an outlet 94 in the head of the secondary cooker 58 and conducts the hot solvent vapors from the secondary cooker 58 to a nozzle 96 confronting the side of the screen opposite the bottom 84 of the box 82. The vapor pressure from the secondary cooker is maintained at about five pounds per square inch. The flow of solvent vapors on the screen 90 has two separate functions. The flow of pressurized solvent vapor sweeps the screen clean and open and prevents clogging of any kind to permit the miscella, including the sticky finer particles, to flow through the screen. The flow of vapor also raises the temperature of any wet particles on the screen 90 to convert the gelatin adhering to the screen by drying into hard solid particles. The solid particles which fail to pass the screen 90 are swept back into the leg 38 of the conveyor 30, and the conveyor 30 drags the solid particles along the conveyor toward the discharge opening 40 thereof. In this manner, the screen 90 is maintained open for a free flow of miscella in accordance with the demands of the miscella pump 64.

The slurry in the primary cooker 22 boils at the boiling point of the azeotrope, whereas the slurry in the secondary cooker 58 boils at the boiling point of the solvent. With ethylene dichloride as the solvent, the primary cooker 22 boils at a temperature of approximately 71½° C. at atmospheric pressure, and the secondary cooker boils at a temperature of approximately 83° C. at atmospheric pressure. It is thus clear that substantial moisture is present in the primary cooker 22 as a result of the relatively large quantity of wet particles being injected into the slurry of the primary cooker. Because of the relatively few particles from the primary cooker 22 which enter the secondary cooker 58 and since the particles that do enter the secondary cooker 58 have been partially dried from the raw state, less moisture is introduced into the secondary cooker 58 than is introduced into the primary cooker 22 in the same period of time. As a result, it is feasible and economically practical to supply sufficient heat to the secondary cooker 58 to drive the temperature of the slurry 62 therein to approximately the boiling point of the solvent. Since there is little water present in this secondary cooker 58, the particles removed therefrom contain very little moisture.

The solid particles passing through the opening 31 from the primary cooker 22 are only partially dried and partially defatted as a result of extraction by the solvent in the slurry of the primary cooker 22. In addition to the fat within the particles, the particles carry with them a quantity of occluded fat. The occluded fat is washed from the particles by a flow of clean solvent introduced into the leg 34 of the conveyor 30 in the upper portion thereof through a port 98. This flow of clean solvent also extracts fat from the particles, since the quantity of moisture in the particles has been reduced to a level permitting extraction by conventional processes. A portion of the solvent flowing from the solvent work tank 50 through the solvent pump 54 is used for this purpose. In this manner, the granular solid particles passing through the opening 40 to the horizontal conveyor 42 have a very low fat content. In addition, the counter-current flow of solvent through the leg 34 and the leg 32 of the conveyor 30 adds to the solvent introduced through the port 52 of the primary cooker 22 to maintain the level of the solvent in the primary cooker and to replace the solvent evaporated by the azeotropic distillation process.

The secondary cooker 58 also is provided with an opening 100 at the bottom thereof, and a second run-around conveyor 102 passes beneath the secondary cooker 58. The second conveyor 102 has a horizontal leg 104 extending below the secondary cooker 58, a rising leg 106 which extends to an opening 108 for depositing dried granular meal into the upper leg 36 of the primary conveyor 30, and hence to the horizontal conveyor 42. The particles passing through the opening 100 are both dry and defatted, and it is not necessary to introduce a counter-flow of fresh solvent in order to wash occluded fat from the particles.

As described above, all of the particles in the conveyor 42 are of low fat content, but those particles from the primary cooker 22 contain substantial moisture. This moisture is removed with the solvent in the desolventizers 44, 46 and 48 to produce a solid product which is granular and contains very little moisture or fat, and hence has great stability. Further, the desolventizers subject the particles to steam for a period of from one-half hour to four hours in order to remove the solvent, and all remaining sulfurous acid is converted to sulfites and sulfates.

The inventor has found that a residue of sulfite principally in the forms of calcium sulfite and sodium sulfite is present in the granules after desolventizing, and in addition small quantities of calcium sulfate and sodium sulfate are present in the residue. The granules are then placed in a vessel containing methyl alcohol in an amount equal to approximately five times the volume of the granules. The granules are then stirred in the methyl alcohol and the alcohol removed. The process is repeated once again, and the alcohol is removed. Thereafter, the product is dried by the application of heat and vacuum.

The use of alcohol is effective to deodorize the product, and at the same time reduces the concentration of the sulfite and sulfate residues. Fish meal produced in this manner has been found to contain approximately 2000 parts per million of sulfite residues.

The secondary cooker 58 is provided with an outlet port 112 near the bottom thereof, and a miscella is withdrawn through the outlet port 112. It is to be noted that the miscella is highly concentrated in fat, since no fresh solvent is introduced into the secondary cooker 58, and the secondary cooker 58 concentrates the miscella from the primary cooker 22. This miscella withdrawn from the secondary cooker 58 is collected in the miscella tank 114, pumped by a pump 116 through one of two filters 118 to a vacuum evaporator 120. The evaporator 120 evaporates the solvent from the miscella, and the fat is thereafter conducted through an oil stripper 122 to a fat storage tank 124.

As an example, one ton of hake may be placed in a vessel having a diameter of three feet and a height of approximately nine feet, the vessel containing approximately 63 cubic feet. The fish will fill approximately 50 percent of the vessel. The fish may be inserted into the vessel without washing or other preliminary treatment. Forty pounds of commercial grade sodium bisulfite is poured on top of the fish when the vessel has been loaded with fish, and the cover of the vessel is then sealed. As an alternative, the atmosphere of the vessel is replaced by an atmosphere of $SO_2$ gas drawn from a tank containing $SO_2$ gas under pressure. All water and other liquid is removed from the interior of the vessel through the port located in the bottom of the vessel, and the port is left open until sulfur dioxide gas begins to flow freely from the port. It takes less than one hour for the sulfur dioxide gas to penetrate the mass of fish within the vessel and begin to flow from the port when sodium bisulfite is used and an even shorter time when applying sulfur dioxide gas from a tank, and at this time the port is closed. The vessel is maintained closed for four weeks. Thereafter, the vessel is opened, and the fish removed. The sulfurous acid content of the fish on opening of the vessel is approximately 0.5 percent by weight. Also, the nutritive value of the fish remains substantially unchanged, that is, the protein biologic quality remains substantially unchanged and the total nitrogen quantity of the fish also remains substantially unchanged throughout the period of storage. There is a slight increase in free fatty acids of the fish during the storage period, approximately the same as occurs in deep-freezing over the same period. The fish must be thereafter processed, for example in a continuous azeotropic dehydrating and defatting process.

The specific example of the present process continues by subjecting the fish to pretreatment with steam for approximately five seconds to convert part of the collagen to gelatin, and thereafter grinding the whole fish in a prebreaker to particles of less than 0.5 inch diameter. The 2,000 pounds of hake are introduced into the primary cooker in a continuous stream over a period of approximately fourteen minutes. The primary cooker is approximately 65 percent full of boiling ethylene dichloride, and the pressure within the vessel of the primary cooker is maintained at substantially atmospheric pressure. The vessel of the primary cooker contains about 800 gallons of ethylene dichloride, and the heating coils 24 of the vessel supplied sufficient heat to maintain boiling at the boiling point of the azeotrope, namely approximately 71½° C. The body of solvent within the primary cooker is kept vigorously boiling.

The secondary cooker is identical to the primary cooker in construction and contains a slurry of approximately 800 gallons which is transferred from the primary cooker to the secondary cooker. Approximately 90 percent of the solid particles removed from the primary cooker and secondary cooker through the conveyors 30 and 102 are removed from the primary cooker through the conveyor 30, and approximately 10 percent are removed from the secondary cooker 102. It is to be understood that the particular ton of hake described in the foregoing example forms merely a portion of a continuous run of the defatting and dehydrating system in which substantally larger quantities of fish are processed. The defatted particles are then desolventized in the presence of steam for four hours and thereafter deodorized in a methyl alcohol bath with agitation for about 10 minutes. The methyl alcohol bath is repeated, and thereafter the particles are dried by heat and vacuum. The particles are then ground to uniform size.

The end product is an odor free particle of about one percent fat, one percent water, seventy percent protein, and contains about 2000 parts per million of sulfite in the form of sodium sulfite and calcium sulfite. The particles are white in color.

A significant improvement is made in the end product by the use of sulfurous acid as a preservative over the product prduced by azeotropic distillation in the same manner from fresh fish. The use of sulfurous acid prior to azeotropic distillation, as set forth above, prevents tieing up certain amino acids, namely cysteine and methionine. Assays of the first week of animal growth of fish processed by azeotropic distillation, as above, but without preservation with sulfurous acid, showed a figure of 130. However, fish processed with 0.5 percent by weight $SO_2$ gas prior to azeotropic distillation, as set forth above, showed a growth factor of 146 and with 1.0 percent $SO_2$ gas by weight a growth factor of 160.

As a second example, the ton of hake described above which has been preserved in sulfur dioxide gas may be processed by azeotropic distillation using a batch system. Using a batch system, the particles of fish are maintained in the primary cooker under boiling conditions until the temperature of the slurry rises from the boiling point of the azeotrope (approximately 71½° C.) to the boiling point of the solvent (approximately 83° C.). The particles are then substantially defatted and dried, and fall to the bottom of the primary cooker. A period of approximately one hour is required to defat and dehydrate the particles in the primary cooker, during which time the pressure within the primary cooker was maintained at atmospheric pressure by evacuation. Thereafter, the conveyor 30 is placed into operation, and the solid particles are removed by the conveyor. The particles are then desolventized and deodorized as described for the first example. Essentially the same product is obtained.

Those skilled in the art will readily appreciate that by utilizing the preservation step of the present invention, the distillation apparatus may be continuously operated to capacity, and further the amino acids of the biological substance being processed are present in the end product to a greater extent than can be achieved with azeotropic distillation without a preservative. As a result, substantial economic advantage to processes may be achieved.

In the foregoing description of the present invention, sulfurous acid present in wet tissue is treated simultaneously with dehydration and defatting of the wet tissue by azeotropic distillation of a polar solvent. The present invention may also be practiced with non-polar solvents, such as heptane, but the product produced will contain phosphatides, thus subjecting the product to reversion. Further, the present invention may be practiced with a solvent which does not form an azeotrope with the interstitial water of the wet tissue, such as methyl alcohol and isopropanol.

It is to be noted that the present invention may also be utilized with eggs, coconut and other products. Not only will preservation in sulfurous acid permit these products to be stored, but the end product produced by azeotropic distillation will contain larger quantities of the amino acids.

Those skilled in the art will readily devise many modifications of the processes herein set forth and many applications of these processes beyond those here disclosed. It is therefore intended that the scope of the present invention be not limited by the foregoing specification, but rather only by the appended claims.

The invention claimed is:

1. The method of treating a biological substance containing water in excess of 10 percent by weight comprising the steps of preserving the biological substance by treating said substance with a sufficient quantity of sulfur dioxide or bisulfite to provide a concentration of sulfurous acid within the substance from 0.1 percent to approximately 3.0 percent by weight converting the substance into particles, heating the particles to a temperature of at least 65 degrees centigrade for a period of time sufficient to volatilize a portion of the sulfurous acid and convert the remaining portion of the sulfurous acid substantially into sulfate and sulfite, removing the vapors and gases from the atmosphere surrounding the particles, and drying the particles to a moisture content less than 10 percent of the weight of the particles.

2. The method of treating a biological substance according to claim 1 wherein the sulfurous acid is provided by the step of maintaining the substance in an atmosphere of sulfur dioxide.

3. The method of treating a biological substance according to claim 1 wherein the sulfurous acid is provided by disposing a mass of bisulfite in contact with the substance.

4. The method of treating a biological substance according to claim 1 wherein the step of heating includes subjecting the particles to an atmosphere of steam for a period of from one-half to four hours.

5. The method of treating a biological substance according to claim 1 in combination with the step of treating the dried particles with an amount of alcohol sufficient to deodorize the particles, and thereafter substantially removing the alcohol from the particles.

6. The method of treating a biological substance according to claim 5 wherein the step of removing the alcohol includes subjecting the particles to steam.

7. The method of treating a biological substance containing water in excess of 10 percent by weight comprising the steps of treating the biological substance with a sufficient quantity of sulfur dioxide to convert the interstitial water of the substance to a solution of sulfurous acid having a concentration from 0.1 percent to 3.0 percent by weight relative to the substance, converting the substance into particles, thereafter injecting the particles into a continuously boiling mass of water-immiscible fat solvent which forms an azeotrope with water and has a boiling point of at least 65 degrees centigrade, thereby forming a slurry of particles, water, and fat, withdrawing the vapors from the mass of boiling slurry, maintaining the temperature of the slurry at least at the boiling point of the azeotrope for a sufficient period of time to reduce the water content of the particles within the slurry to less than 10 percent of the particles by weight, whereby the sulfurous acid content of the substance is at least partially converted to sulfate, and removing the particles from the slurry and the solvent.

8. The method of treating a biological substance containing methionine according to claim 7 wherein the concentration of sulfurous acid in the substance is between 0.1 percent and 0.5 percent of the weight of the particles.

9. The method of treating a biological substance according to claim 7 in combination with the step of thereafter heating the particles to a temperature between 65 and 125 degrees centigrade for a period of between one-half hour and four hours.

10. The method of treating a biological substance according to claim 9 wherein the heating step is carried on in the presence of steam.

11. The method of treating a biological substance according to claim 9 in combination with the step of extracting the fat from the particles to less than 5 percent by weight of the particles prior to heating the particles.

12. The method of treating a biological substance according to claim 9 in combination with the step of thereafter treating the particles with an amount of alcohol sufficient to deodorize the particles.

13. The method of treating a biological substance according to claim 7 wherein the substance contains sulfurous acid in a concentration between 0.5 and 3.0 percent by weight before being injected into the mass of boiling solvent, and wherein the substance is maintained under ambient temperature conditions for a period of time up to 60 days prior to injection into the mass of boiling solvent.

14. The method of treating animal tissue containing water in excess of 10 percent by weight comprising the steps of preserving the animal tissue by treating said tissue with a sufficient quantity of sulfur dioxide or bisulfite to convert the interstitial water of the animal tissue to a solution of sulfurous acid having a concentration from 0.1 percent to 3.0 percent by weight of the animal tissue, converting the animal tissue into particles, thereafter injecting the particles into a continuously boiling mass of water-immiscible fat solvent which forms an azeotrope with water and has a boiling point of at least 65 degrees centigrade, thereby forming a slurry of particles, water, and fat, withdrawing the vapors from the mass of boiling slurry, maintaining the temperature of the slurry at least at the boiling point of the azeotrope for a sufficient period of time to reduce the water content of the particles within the slurry to less than 10 percent of the particles by weight, whereby the sulfurous acid content of the tissue is at least partially converted to sulfate, and removing the particles from the slurry and the solvent.

15. The method of treating animal tissue according to claim 14 wherein the animal tissue is in the form of whole fish and the step of converting the interstitial water of the animal tissue to a solution of sulfurous acid consists of subjecting the whole fish to an atmosphere of sulfur dioxide.

16. The method of treating animal tissue according to claim 14 wherein the water-immiscible fat solvent is a polar solvent.

17. The method of treating animal tissue containing interstitial sulfurous acid having a concentration of 0.1 percent to approximately 3.0 percent by weight of the animal tissue in order to render said tissue suitable for consumption comprising the steps of removing said acid by converting the animal tissue into particles, thereafter injecting the particles into a continuously boiling mass of water-immiscible fat solvent which forms an azeotrope with water and has a boiling point of at least 65 degrees centigrade, thereby forming a slurry of particles, water and fat, withdrawing the vapors from the mass of boiling slurry, maintaining the temperature of the slurry at least at the boiling point of the azeotrope for a sufficient period of time to reduce the water content of the particles within the slurry to less than 10 percent of the particles by weight, whereby the sulfurous acid content of the tissue is at least partially converted to sulfate, and removing the particles from the slurry and the solvent.

References Cited

UNITED STATES PATENTS

| | | | |
|---|---|---|---|
| 2,509,633 | 5/1950 | Flanzy | 99—154 |
| 2,619,425 | 11/1952 | Levin | 99—208 |
| 2,972,542 | 2/1961 | Levin | 99—209 |

OTHER REFERENCES

Condensed Chemical Dictionary, 5th edition, 1956, pp. 1050–1051.

RAYMOND N. JONES, Primary Examiner

S. B. DAVIS, Assistant Examiner

U.S. Cl. X.R.

99—7, 107, 199; 114—74